United States Patent
Desmicht et al.

(10) Patent No.: US 7,552,343 B2
(45) Date of Patent: Jun. 23, 2009

(54) CONDITIONAL ACCESS CONTROL

(75) Inventors: Eric Desmicht, Caen (FR); Stéphane Mutz, Caen (FR); Christophe Tison, Douvres la Delivrande (FR)

(73) Assignee: NXP B.V., Eindhoven (NL)

( * ) Notice: Subject to any disclaimer, the term of this patent is extended or adjusted under 35 U.S.C. 154(b) by 424 days.

(21) Appl. No.: 10/507,808

(22) PCT Filed: Mar. 11, 2003

(86) PCT No.: PCT/IB03/00940

§ 371 (c)(1),
(2), (4) Date: Sep. 14, 2004

(87) PCT Pub. No.: WO03/079687

PCT Pub. Date: Sep. 25, 2003

(65) Prior Publication Data
US 2005/0152545 A1    Jul. 14, 2005

(30) Foreign Application Priority Data
Mar. 19, 2002   (FR) .................................. 02 03371

(51) Int. Cl.
*H04L 9/10*   (2006.01)
*G06F 21/00*   (2006.01)
(52) U.S. Cl. .......................... 713/189; 713/185; 380/44
(58) Field of Classification Search ................. None
See application file for complete search history.

(56) References Cited

U.S. PATENT DOCUMENTS

| | | | | |
|---|---|---|---|---|
| 5,590,200 A * | 12/1996 | Nachman et al. | ............... | 380/46 |
| 5,937,067 A * | 8/1999 | Thatcher et al. | ............. | 380/212 |
| 6,105,134 A * | 8/2000 | Pinder et al. | ................. | 713/170 |
| 6,157,719 A * | 12/2000 | Wasilewski et al. | ......... | 380/210 |
| 6,424,717 B1 * | 7/2002 | Pinder et al. | ................. | 380/239 |
| 6,526,508 B2 * | 2/2003 | Akins et al. | .................. | 713/168 |
| 6,937,729 B2 * | 8/2005 | Akins et al. | .................. | 380/239 |
| 6,959,090 B1 * | 10/2005 | Alve et al. | .................... | 380/277 |
| 6,993,661 B1 * | 1/2006 | Garfinkel | ..................... | 713/193 |
| 7,360,088 B2 * | 4/2008 | Mishina et al. | ............. | 713/168 |
| 2002/0101989 A1 * | 8/2002 | Markandey et al. | ......... | 380/210 |
| 2002/0108040 A1 * | 8/2002 | Eskicioglu | ................... | 713/172 |
| 2003/0005435 A1 * | 1/2003 | Nelger et al. | .................. | 725/31 |

(Continued)

FOREIGN PATENT DOCUMENTS

EP    1182874    2/2002

*Primary Examiner*—Chistopher A Revak

(57) ABSTRACT

The invention relates to a secure data processing system including an unscrambling module [DSC] disposed on a dedicated hardware part [HW] of an integrated circuit and intended to unscramble a stream of data [SP] scrambled according to a scrambling key, a module [CM] for calculating an unscrambling key [Kp] disposed on said dedicated hardware part [HW] and intended to manipulate data under the control of a so-called calculation program stored on said dedicated hardware part [HW], a processor [CPU] for in particular controlling the functioning of the unscrambling [DSC] and calculation [CM] modules. Said system also includes a read only memory [SME] disposed on said dedicated hardware part [HW] for storing a secret key [Kp]. Said calculation program includes instructions for prompting said calculation module [CM] to use said secret key [L] and at least one data item [AC[n,p] or Kpc)] coming from outside the secure data processing system, in order to calculate an unscrambling key [Kp]. The unscrambling is enabled only if the unscrambling key [Kp] corresponds to the scrambling key.

22 Claims, 5 Drawing Sheets

U.S. PATENT DOCUMENTS

| | | | |
|---|---|---|---|
| 2003/0174844 A1* | 9/2003 | Candelore | 380/277 |
| 2004/0088588 A1* | 5/2004 | Awada et al. | 713/202 |
| 2005/0028064 A1* | 2/2005 | Thomas et al. | 714/752 |
| 2006/0090084 A1* | 4/2006 | Buer | 713/189 |
| 2008/0077797 A1* | 3/2008 | Greco et al. | 713/176 |
| 2008/0181399 A1* | 7/2008 | Weise et al. | 380/44 |

* cited by examiner

CONDITIONAL ACCESS CONTROL

FIELD OF THE INVENTION

The invention relates to a secure data processing system. Such a system normally includes conditional access control in reception and/or transmission mode. The invention in particular finds an application in controlling the use of receivers/decoders and more particularly in the management of rights of access to digital contents.

BACKGROUND OF THE INVENTION

Protecting the content of programs sent by satellite, cable or radio is in fact essential for the operators. The latter being remunerated by subscriptions, a system which can easily be pirated results in a loss of earnings. The transmission of scrambled or encrypted data is well known in the field of pay television systems, where the scrambled digital audiovisual data are typically sent by conventional transmission means to a certain number of subscribers. The subscribers have a receiver/decoder capable of unscrambling the data in order to make them capable of display. Receivers/decoders include in particular set-top boxes, where the decoder functions in combination with a receiver physically separate from the decoder, the said receiver being able to include additional functions, such as a system for browsing on a network, the Internet for example, a video recorder, a television etc.

In pay television systems, the scrambled data are transmitted together with a control word for unscrambling the digital data. The control word itself is scrambled with an operating key and transmitted in scrambled form. The scrambled data and the scrambled control word are received by the receiver/decoder having an equivalent to the operating key necessary for unscrambling the control word and then unscrambling the data transmitted. Conditional access therefore in general uses information dedicated to conditional access within the data stream and a conditional access system capable of using this information.

Current boxes are protected by a smart card. The box sends to the smart card coded information, the information for conditional access, in the data stream received. The smart card then decides to send or not a key for unscrambling the program. Such a box is known from the document EP 1 182 874.

The invention relates to the following considerations:

In general, in the state of the art, all the protection of the box lies in the smart card. Firstly, communication between the smart card and the box is the weak point in the circuit. This communication is not secure or is protected only by software, which means that the protection is weak. Consequently it is possible to listen to this communication in order to determine the key allowing unscrambling. This key may then be used directly in order to pirate other boxes. Secondly, the fact that all (or almost all) protection is based on a separable and isolatable element of the box facilitates the work of pirates, who because of this do not have to seek the protection in often complex boxes.

SUMMARY OF THE INVENTION

One aim of the invention is to make it possible to prevent the key allowing unscrambling to be able to be listened to on a communication line which is not protected or little protected and to afford guaranteed security of the box.

In fact a secure data processing system is characterized according to the invention in that it includes:

an unscrambling module disposed on a dedicated hardware part of an integrated circuit and intended to unscramble a stream of data scrambled according to a scrambling key, a module for calculating an unscrambling key disposed on said dedicated hardware part and intended to manipulate data under the control of a so-called calculation program stored on said dedicated hardware part, a processor for at least controlling the functioning of the unscrambling and calculation modules, a read only memory disposed on said dedicated hardware part for storing a secret key, said calculation program including instructions for prompting said calculation module to use, internally to said dedicated hardware part, said secret key and at least one so-called external data item coming from outside the secure data processing system, in order to calculate an unscrambling key, intended to be used internally to said dedicated hardware part, within the unscrambling module, and allowing unscrambling only if the unscrambling key corresponds to the scrambling key.

The system proposed introduces protection in the main circuit itself of the box. Through its internal work on the secret key, said dedicated hardware part of said main circuit avoids exchanges of data relating to the secret key with elements of the circuit external to said dedicated hardware part. This system is secure since it is implemented physically on the main circuit and the hardware elements are difficult to pirate. In an advantageous embodiment of the invention, the secret key is physically laser-fused to said dedicated hardware part of the main circuit of the box. The processor used may be either present on the main circuit or be external to this but it is external to said dedicated hardware part. Though this processor controls the functioning of the system, it can nevertheless never have access to the laser-fused secret key, nor to the results of the calculation, nor to any other intermediate result of this calculation. The manipulations of these data being carried out internally to said dedicated hardware part, the interaction of the processor with the elements which manipulate secret data is exclusively external in order to prevent any listening to the secret data within the processor. Because of this, even if the processor is unlegally listened, it cannot reveal the secret key and the result of the calculation. A system is thus designed in order not to be able to be pirated by common tools and if the system is despite everything pirated and the algorithms are found, a user, even with a description of the system and the added modules, will not be capable of pirating his own box. In an advantageous embodiment of the invention, the processor is the central processor of the box. This allows a reduction in the cost which would correspond to the insertion of a second processor in the box. This central processor is generally integrated on the main circuit but its program and data are in general stored in non-volatile external memory.

According to a first embodiment of the invention, the so-called external data item is conditional access information conveyed within the stream of scrambled data. According to a second embodiment of the invention, the so-called external data item is the unscrambling key scrambled according to said secret key used in the calculation module.

The system according to the invention can be implemented in any electronic apparatus intended to exploit scrambled external data advantageously provided with a secure data processing system, or conditional access system. Within such an apparatus (set-top box etc), the system according to the invention can be implemented alone or in combination with a smart card according to the implementation chosen. If the system is implemented alone, it is in charge of all the access control. If the system is implemented in combination with a smart card, the system is used for protecting communication between the smart card and the main circuit. In its applications, the invention therefore relates particularly to pay television systems.

Finally, the invention relates to a smart card intended to function within an electronic apparatus according to the invention, a method of protecting an electronic apparatus and a computer program product for implementing this method.

The invention will be further described with reference to examples of embodiments shown in the drawings to which, however, the invention is not restricted.

DETAILED DESCRIPTION OF THE INVENTION

The following remarks concern the reference signs. Similar entities are designated by identical letters in all the FIGURES. Several similar entities may appear in a single FIGURE. In this case, a digit or a suffix is added to the reference by letters in order to distinguish similar entities. The digit or the suffix may be omitted for convenience. This applies to the description and to the claims.

The following description is presented to enable a person skilled in the art to implement and make use of the invention. This description is provided in the context of the patent application and its requirements. Various alternatives to the preferred embodiment will be obvious to a person skilled in the art and the generic principles of the invention disclosed here can be applied to other uses. Thus the present invention is not deemed to be limited to the embodiment described but rather to have the widest scope in accordance with the principles and characteristics described below.

Figure 1:
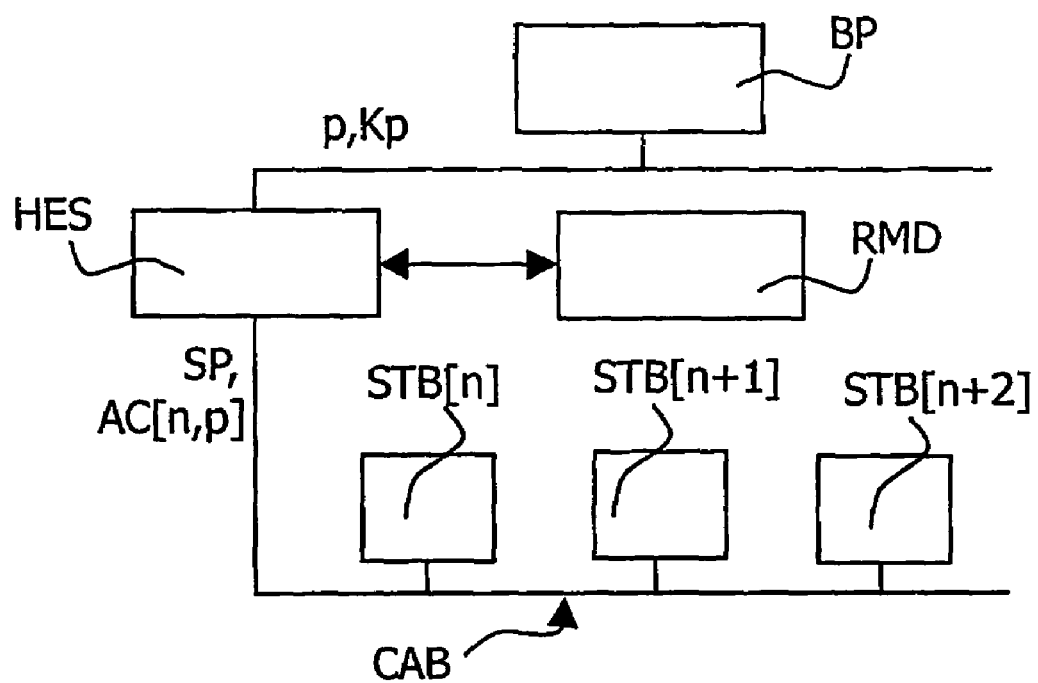
FIG. 1 is a schematic diagram of an example of a network of cabled boxes within which the invention finds an application.

FIG. 1 is a schematic diagram of an example of a cabled network of boxes or electronic apparatus within which the invention is applied. It should be noted here that this FIGURE is only indicative of a special application of the invention where the boxes are cabled. At least one data sender BP offers a content p. The term sender is here used for defining any entity which produces content and/or which makes a content compatible with the distribution: for example, a television studio which produces contents in television program form. The term may refer either to a technical apparatus by which the content is sent or to a legal or commercial entity associated with the content. The term content p is here used for defining data which can be used in practice within a receiver: this will for example be audio and/or video data (a television program for example), interactive data, computer software, data associated with particular software or other types of data.

The content p is preferably directly scrambled by the sender BP according to a scrambling key Kp in order to give a scrambled content SP. This sender BP is connected to a transmission station HES which makes it possible to send data in a certain transportation format over transmission means. It is also possible to have a stream of uncoded data between the sender and the transmission station, this data stream being able in particular to include the scrambling key, in which case the scrambling is carried out within the transmission station. According to FIG. 1, this transmission station is for example the head transmission station of a cabled television network and the transmission means is a cable. However, firstly, the transmission means may be different: radio network, telephone connection, network connection (Internet for example), a satellite, in which case the transmission station HES is a network operation center of a satellite transmission system etc. Other senders of scrambled contents SP can be connected to this transmission station HES. The transmission station HES has in particular a role of multiplexing the scrambled contents SP and of adding supplementary information AC[n,p] in the data stream according to the box or boxes n to which the data may be transmitted. This addition of supplementary information is carried out by means of a database intended for managing rights of the users RMD. This addition is periodic, the periods of insertion of this information being variable. Thus this supplementary information AC[n,p] serve for the conditional management of access. They are for example messages according to the EMM ("Entitlement Management Messages") and ECM ("Entitlement Control Messages") standards. According to FIG. 1, various user boxes STB are connected by a cable CAB to the transmission station HES. For transmission means other than cable, the principle of connection between the boxes STB and the transmission station HES is similar.

The data stream is transmitted to the various boxes STB by said cable CAB. According to the conventional conditional access control systems, each box has a public identifier n attached to the box, generally stored on the main circuit of the box, and a key for calculating the unscrambling key. As seen above, this key is in general placed on a smart card which can be separated from the box, which poses a certain number of drawbacks disclosed above. This key is modified regularly in order to reduce the risk of having the box pirated. However, communication between the smart card reader and the main circuit of the box is in general not protected and the communication can consequently be listened to. As from the time when this communication is listened to, it is possible to go back to the key making it possible to calculate the unscrambling key. In addition, a smart card can be used on various boxes, which may reduce the revenues of the box distributor. The invention aims to avoid these drawbacks of the state of the art. According to the invention, each box has not only a public identifier on the main circuit of the box but also a secret key, peculiar to the box, not accessible and permanent, without which the unscrambling cannot be carried out. According to the invention, the content p is scrambled by the sender or by the transmission station with a key Kp. If the owner of the box n has paid to receive the content p, the transmission station opens access to the box n by sending supplementary information for conditional access in the form of an access code AC[n,p]. This code AC[n,p] is included in the transportation stream. An access code is inserted for each of the boxes whose owner has paid to receive the content p, as private data. The content of this access code may be variable over time, and in particular the various items of information contained in this code can be sent at different periodicities. This access code is compatible with the known box identification systems and may even use them (DVB mechanisms standing for "Digital Video Broadcasting" EMM standing for "Entitlement Management Messages" and ECM standing for "Entitlement Control Messages" for example). For example, the book "Digital Television and MPEG-1, MPEG-2, European DVB System" by Hervé Benoit, published by Dunod, describes such identification systems. The box n then combines the access code AC[n,p] with the secret key stored in the main circuit of the circuit so as to find the scrambling key Kp. With the key Kp, the main circuit of the box is then capable of unscrambling the content by using the key Kp within a conventional unscrambling module (DVB for example). It is noteworthy that this implementation is compatible with the Simulcrypt DVB standard described in particular in the book cited above. According to this standard, the content p is transmitted only once and scrambled in only one way for all the boxes connected, and hence an appreciable saving in bandwidth. In addition, several conditional access systems can coexist on the same network. This is because the key Kp and the DVB unscrambling module (e.g.: DVB unscrambler) are common to all conditional access systems. Only the conditional access messages (EMM and ECM) are specific according to the invention for containing the conditional access information necessary according to a given periodicity for each of the boxes.

Figure 2:
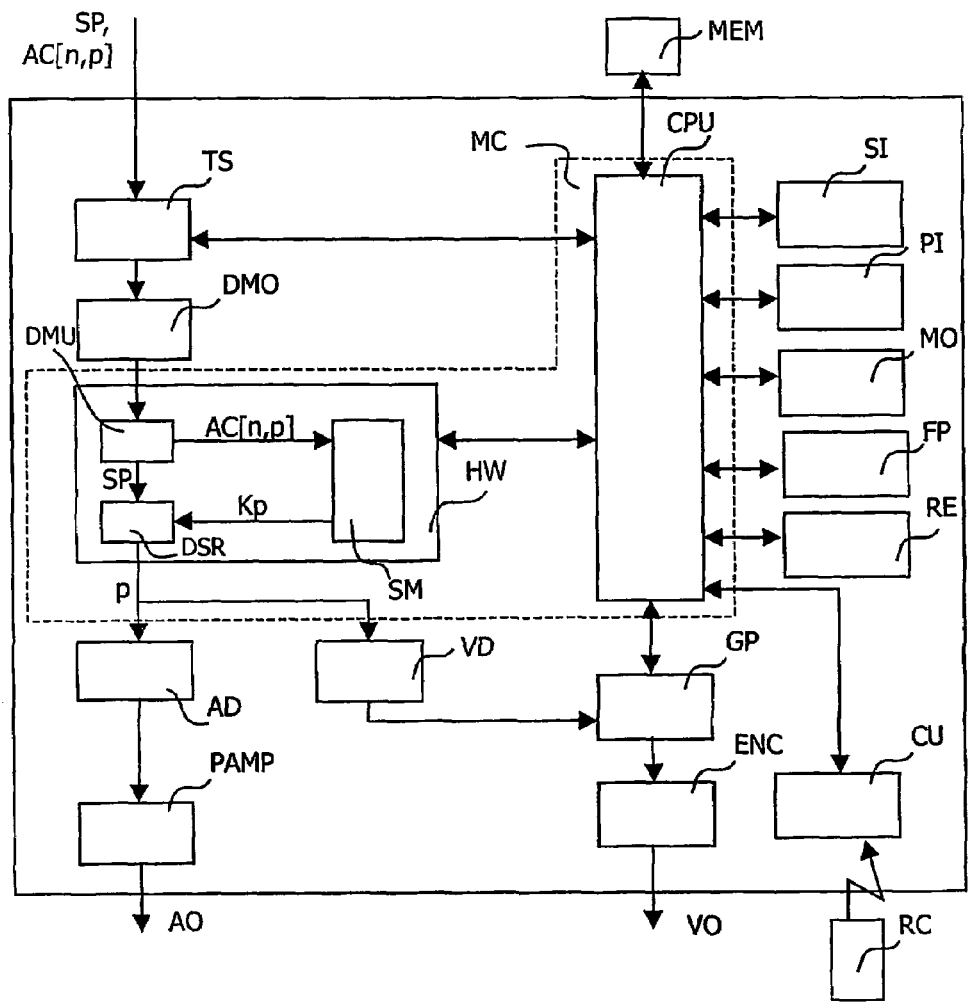
FIG. 2 is a schematic diagram of a box according to the invention.

FIG. 2 is a schematic diagram of a receiver/decoder box according to the invention. The various elements of the box will now be described in terms of functional blocks. The receiver/decoder box, which can advantageously be a digital box known in general as a "set-top box", includes a central processor CPU connected to memory elements MEM. These memories can be RAM memories, Flash memories or ROM memories. These memories can be disposed on a so-called main circuit MC, including in particular said processor, but more generally they are situated externally to said main circuit, as depicted in FIG. 2. These memories include non-secret programs and data for the functioning of the processor CPU. This central processor CPU is also generally adapted to receive data from interfaces which may be serial interfaces SI, parallel interfaces PI, a modem MO, control elements placed on an external face FP of the box or on a remote control RC connected with a control unit CU, readers RE for various media etc. FIG. 2 is indicative of only a simple embodiment according to the invention. A box according to the invention can in particular comprise one or more smart-card readers which make it possible to add supplementary functionalities and/or conditional access controls, which are more flexible and capable of variation (pay per view for example). The use of a smart card for access control is thus complementary and its reader is connected to the central processor CPU by communication channels known in the state of the art. The decoder also generally includes a tuner selector TS and a demodulator DMO for receiving and demodulating the data stream transmitted by the transmission means before the data stream is filtered and demultiplexed within the main circuit MC of the box. The main circuit MC, depicted in dotted lines, is entirely implemented on one and the same integrated circuit. Thus a hardware part HW of this integrated circuit can easily be implemented in such a way that no data item which said dedicated hardware part HW manipulates circulates outside said hardware part HW, which affords a high level of security. Thus all the modules of the access control system according to the invention are integrated in one and the same dedicated hardware part HW of said main circuit so that the communications between the various modules cannot be spied on and no element of the circuit, processor or other, situated in an unsecure environment, can access the secret key, the results of the various calculations or any intermediate calculation results. It should be noted here that, in FIG. 2 and subsequently, said protected data processing system is merged with said hardware part HW. This does not exclude the fact that the hardware part may include elements other than those present in said protected data processing system. It should be noted in addition that it is necessary not to make secret data pass through the processor CPU, even if the latter is disposed on the main circuit MC, since the structure thereof would make it possible to have access to the data being manipulated and consequently security would be reduced. Hereinafter, the processor CPU allows the functioning of the various elements of the dedicated hardware part HW but never has access to the secret data, whether these are raw data or the intermediate calculation results. These secret data must remain in the hardware part HW of the circuit, which is difficult to access.

When the information for the conditional access AC[n,p] according to the invention arrive in the receiver/decoder, they enter the dedicated hardware part HW and are for example, according to FIG. 2, detected within the demultiplexer DMU, separated from the scrambled content SP and then sent to a security module SM. This security module SM is disposed on the dedicated hardware part HW according to the invention and will contain some of the essential elements according to the invention. This security module SM manages the conditional access according to the invention and returns a key Kp which, if it corresponds to the key according to which the content p is scrambled, will allow unscrambling of the scrambled content SP within the unscrambling module DSR, which is also disposed on said dedicated hardware part HW.

The receiver/decoder also includes applications stored in memory or downloaded as required, for processing and exploiting the content p so as to transform it into video output data VO and/or audio output data AO. These applications and their uses will not be described here. However, FIG. 2 depicts certain so-called basic applications for a receiver/decoder intended to process audio/video data: for example, an audio decoder AD, a preamplifier PAMP, a video decoder VD, a graphical data processor GP, a PAL/SECAM encoder ENC etc.

Figure 3:
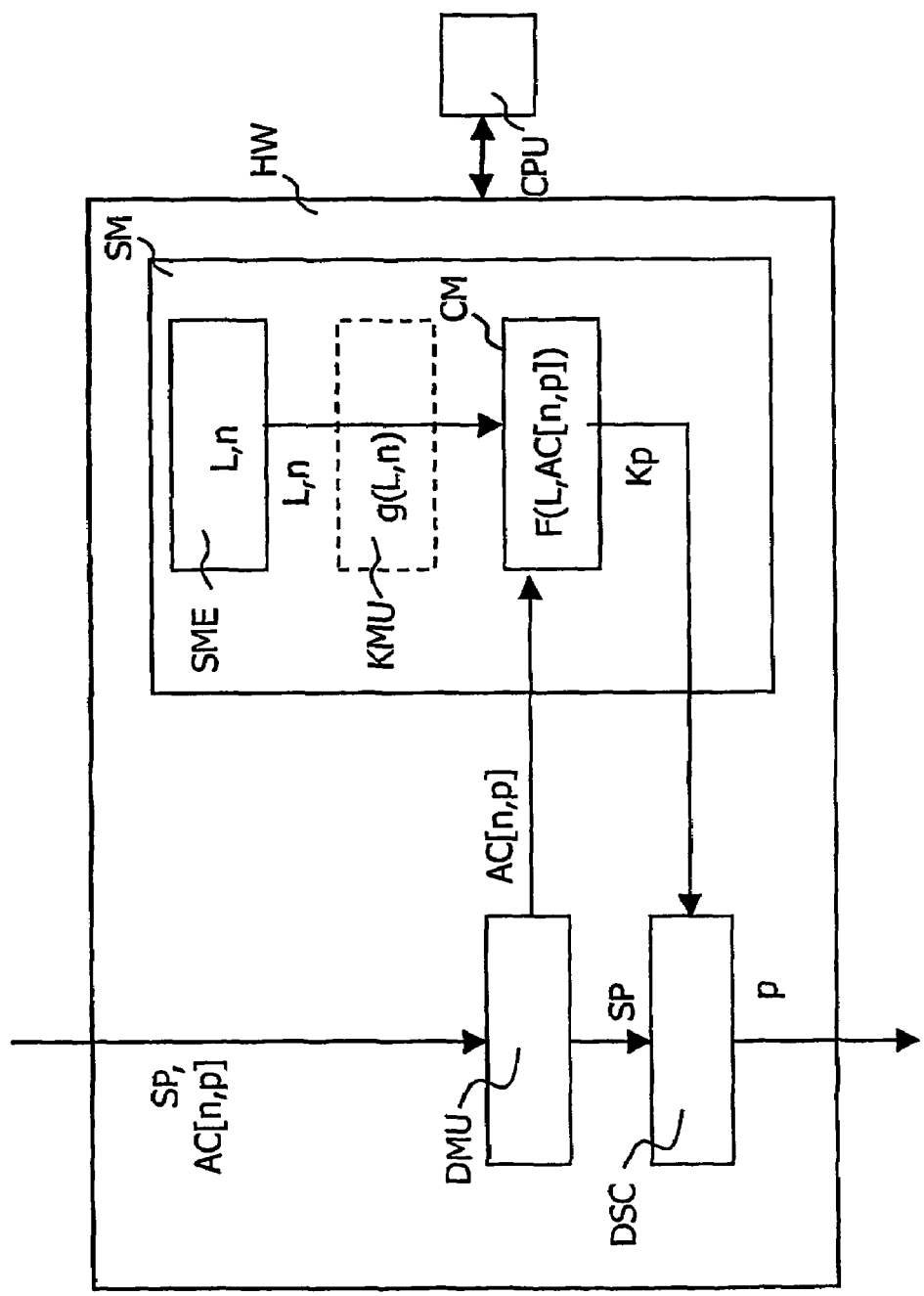
FIG. 3 is a schematic diagram of a first embodiment of the dedicated hardware part within which the secret data circulate, implemented within a main box circuit including a conditional access system according to the invention.

FIG. 3 is a schematic diagram of the dedicated hardware part HW within which the secret data circulate, said hardware part being included in a main box circuit MC including a conditional access system according to the invention. The conditional access system according to the invention is here once again represented by the hardware part HW. A security module SM is more particularly responsible for calculating the unscrambling key Kp. This module includes at least two elements according to the invention: a secret key L stored in a non-volatile read only memory SME, and a calculation module CM intended to calculate the unscrambling key from the secret key L. The security module SM functions under the control of the CPU by means of an interface CPU but the processor CPU does not manipulate data relating to the secret data manipulated. However, the CPU allows the functioning of the various units of said dedicated hardware part HW without having access to the values which are manipulated therein within the hardware part HW including these various units. Optionally, the security module may comprise a manipulation module KMU for the secret key L.

In an advantageous embodiment, the non-volatile read only memory SME is a ROM memory laser-fused according to the value of the secret key L. It is also possible for the value of the secret key L to be stored in a memory produced by ion implantation, by "antifuse" technique, or in a Flash memory programmed so as to be programmable only once. All techniques which can be used for identifying a chip can be used here. However, for a chip according to the invention, means of testing the value present in the memory SME must be designed to make it possible to keep the value of the secret key L secret. The text below describes one way of proceeding with a laser-fused ROM memory according to one advantageous embodiment of the invention. The non-volatile read only memory SME used includes for example the secret key L and a public identifier n of the box. The public identifier n does not need to be kept secret. For a given n, only one chip has this value. Consecutive chips do not necessarily have consecutive identifiers n. The value n is for example a combination of the reference of the silicon wafer from which the chip was produced with the position X and the position Y thereon. n is for example coded in 64 bits with a certain number of bits for the following headings: identifier of manufacturer, identifier of product, identifier of batch, reference number of the silicon wafer, position X and position Y. As n does not need to be kept secret, the value of n can be read by external test elements in order to verify that the laser-fusing phase has indeed been carried out. The value of n can thus be read through the interface with the central processor CPU in order to verify the laser fusing. The value of L is also for example coded in 64 bits, including 56 for coding the information and 8 bits for creating a signature of these 56 bits. Said signature of these 56 bits makes it possible to make a check on the laser fusing of L without this test means making it possible to access the value of L. This is because the verification of the laser fused value of L cannot be identical to that of n, which is a public value. The value of L is kept secret and it is not possible to access it by the test means cited above in the case of a public identifier n. The test on the value L is carried out by comparing two signatures, one calculated with the 56 laser-fused bits for L and the one represented by the 8 bits implemented in hardware fashion on the circuit: a signal is generated in order to state whether they are identical and therefore whether or not the laser-fused value L does indeed have the expected signature. The laser fusing is generally carried out on a buried layer of metal, that is to say not on the surface of the circuit. Laser fusing is a technique known in the state of the art for, for example, repairing memories. However, the use of a laser-fused data item according to the invention is entirely original compared with the state of the art. Laser fusing consists conventionally of setting a certain number of data to 1 and then cutting the connections with a laser so as to set certain data to 0. The application of this principle is known in the technology used for manufacturing semiconductors. The optional module KMU for manipulating the key, depicted in dotted lines in FIG. 3, calculates a secret code from the secret key L and/or from the public identifier n. This optional module KMU is provided when it is assumed that L will not always be laser fused optimally and that a key including sufficient bits for being exploited in the calculation module CM must be available. The data available for L in the laser-fused memory may in fact not be sufficient for the calculation module CM. The optional module KMU then calculates supplementary bits so that the resulting secret code which is the final secret key has the number of bits necessary for the functioning of the calculation module. This calculation of a supplemented new key is made according to a function g and can be carried out with the present data of L and those of n for example. If the calculation is made only according to the value of n, the calculation algorithm can be found by a user wishing to pirate his box and, as he may know the value of the public identifier n, pirating thus becomes easy for his box and the other boxes of the same type. The optional module KMU can also be used when the calculation module is designed to use keys with a 128-bit format and only 56 bits have been laser fused, for example. In this case, the optional module KMU will create the missing 128-56 bits from bits of n and L in order to have a new secret key with a different size.

Figure 4:
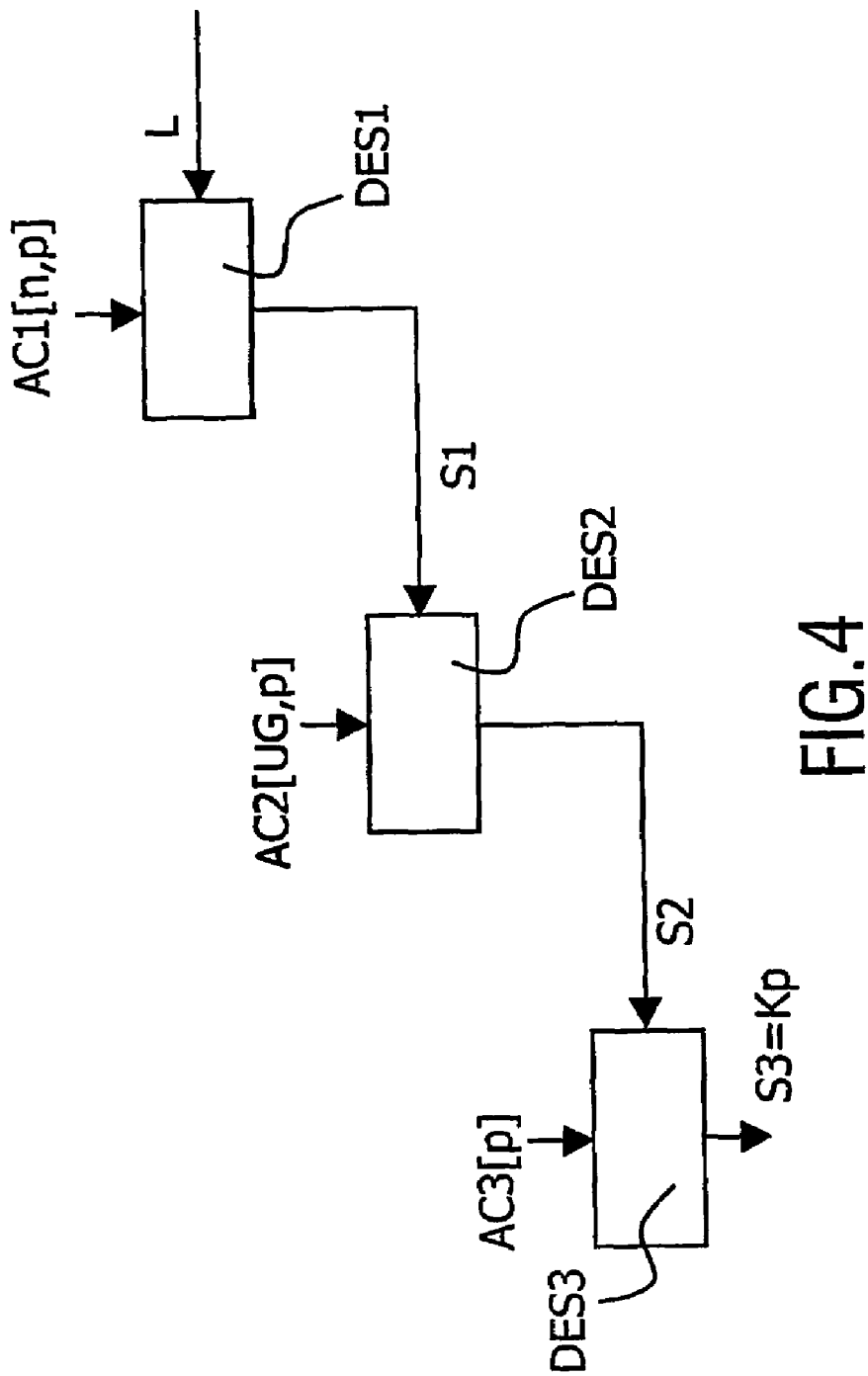
FIG. 4 illustrates the functioning of the calculation of the unscrambling key according to the invention.

In a first embodiment, within the calculation module CM, the secret key L (or the key calculated at the output of the optional module from L and n) is combined with the conditional access information AC[n,p] so as to obtain the unscrambling key Kp=F(L, AC[n,p]). The function F is chosen so that the calculation module CM of the box n can easily calculate the unscrambling key Kp knowing AC[n,p] and L. The function F is also chosen so that the transmission station can easily offer access to the box n, that is to say can easily calculate AC[n,p] knowing L and Kp. Finally, the function F is chosen so that a user wishing to pirate his box cannot easily access L knowing Kp and AC[n,p]. This is the case of a user who disassembles the chip in order to determine its functioning ("reverse engineering") and listens to the network of boxes so as to be able to see the same contents as a neighboring user free of charge. An example of the algorithmic functioning of the function F is the subject of FIG. 4. The unscrambling key Kp is then transmitted to the unscrambling module DSC situated on the same hardware part HW of the integrated circuit as the security module SM. It will therefore be noted that no secret data item relating to the value L (or to the calculation according to the function g) circulates outside the main integrated circuit or is manipulated by the processor of the box, which prevents pirate readings of these values. Possibly, at the output of the security module SM, the unscrambling key Kp can also be modified according to the functioning of other access systems before serving for the unscrambling according to principles other than those proposed by the invention. Referring to FIG. 4 and according to a preferred embodiment of the invention, the function F functions according to a particular algorithm. According to this algorithm, the conditional access information AC[n,p] includes three words each of 64 bits AC1[n,p], AC2[n,p], AC3[n,p]. This number of words and their size can also be modified without being excluded from the principles of the invention. According to the algorithm of the preferred embodiment, L first of all, and then the result of each operation, are in turn combined in combination modules DES with each of these three words in a given order so as to obtain the unscrambling key Kp. As the calculation is programmed on the integrated circuit itself, the intermediate values S1, S2 and S3 (S3 being the unscrambling key itself), resulting from the partial combinations, are kept secret and cannot be read by any software element.

For example, the combination modules DES are modules implementing a combination algorithm which can for example use DES ("Data Encryption Standard" published by the U.S. Department of Commerce/National Institute of Standards and Technology) mathematical tools which work on 64 bits. Other types of algorithm (AES, Triple DES etc) affording selectivity of the possible deduction of a value from a certain number of other values are possible in a conditional access without this excluding a conditional access system from the principles stated by the invention.

An example of an indicative implementation of the possibilities of choice of values AC1[n,p], AC2[n,p], AC3[n,p] and of their characteristics is given below but many other scenarios may be envisaged.

AC1[n,p] is for example used for defining a user. According to the invention, AC1[n,p] designates a single box or possibly two boxes bearing the same secret key (for example in the same house). AC1[n,p] can for example come from identification messages (EMM for example) periodically and be stored in flash memory for starting up the box, in which case the value can be recalled. AC1[n,p] can in particular be stored once a month when the subscription is paid for the box n. The word AC1[n,p] is strictly attached to the box n; there is a word AC1[n,p] for each box (or possibly for several boxes for which the access conditions will always be the same, within the same house for example). For example, once a month, the content sender sends in the data stream a value AC1[n,p] for each box connected which has paid to receive the content. The information necessary for unscrambling the data is therefore communicated in a different form for each user and peculiar to the secret key etched (laser fused) on the box. AC1[n,p] is a value which can be changed every month for example in order to reduce the bandwidth necessary for the setting up of this type of conditional access, but any other periodicity can also be envisaged. This word AC1[n,p] peculiar to each box and therefore to each secret key L, is combined in a calculation submodule DES1 with the laser-fused key L (or the result of the calculation made by the optional module KMU) in order to obtain S1. All the members of a group of users UG share the same value S1 which is, on the other hand, obtained differently in each box.

AC2[n,p] can be extracted from the identification message (EMM for example) which opens access to a service for the group of users UG determined above (that is to say sharing the same value of S1). If this group of users has paid to receive a content, the transmission station will send this word AC2[n,p] to the boxes corresponding to said users. Therefore, in reality, AC2[n,p]=AC2[UG,p]. AC2[UG,p] is combined within a calculation sub-module DES2 with S1 in order to obtain S2. This time all the users who have paid for said service share the same value S2. This value can for example also be changed every month but any other periodicity can also be envisaged.

AC3[n,p] can for example be the ECM message of a given service. It can be changed for example every 3 seconds. AC3[n,p] is therefore generic for the program and therefore in reality, here, AC3[n,p]=AC3[p]. AC3[p] is combined within a calculation submodule DES3 with S2 in order to obtain S3. The result of the functioning of the algorithm is the unscrambling key S3=Kp. It is noteworthy that, according to the Simulscript standard, a unique scrambling key is used for scrambling the content, which is consequently transmitted only once. On the other hand, each security module being different, each way of communicating the key will in some way be different. The unscrambling key is used for updating the parameters within the unscrambling module DSC and for unscrambling the content which is transmitted over the network of boxes.

In total, an implementation of this secure module does not exceed 0.1 mm² in CMOS12 technology, which makes it very inexpensive. This is a major advantage of the invention.

Figure 5:
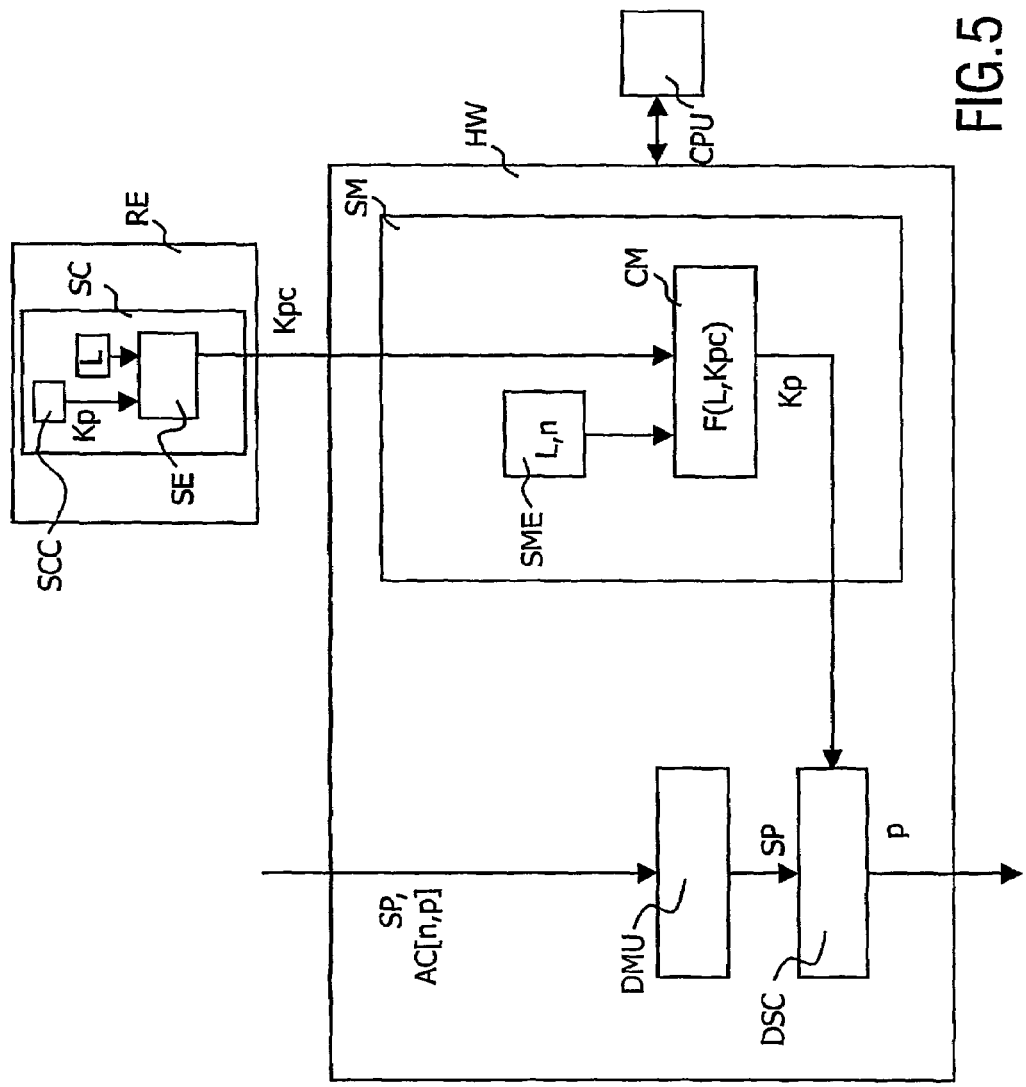
FIG. 5 is a schematic diagram of a second embodiment of the dedicated hardware part within which the secret data circulate, implemented within a main box circuit including a conditional access system according to the invention.

In a second embodiment of the invention depicted in FIG. 5, the conditional access system according to the invention is in interaction with a conditional access system with a smart card SC. The advantage of the global conditional access system resulting therefrom is that the smart card SC makes it possible to add functionalities to the box which is not permitted by the conditional access system according to the invention used alone. The smart card SC can for example provide a functionality of payment per session. The weakness of the smart card systems is the communication between the reader RE and the main circuit of the box through which the unscrambling key Kp circulates. According to the particular use of the invention, the unscrambling key Kp circulates scrambled according to the secret key L between the smart card SC and the main circuit MC. A smart card SC according to the invention will include in memory the value of L and, within a scrambling element SE, scrambles the unscrambling key Kp calculated by the card within an element SCC with the secret key L in order to obtain the scrambled unscrambling key Kpc. A security module SM will receive Kpc as a so-called external data item according to the invention, and will unscramble it with the value of L, in order to obtain Kp directly. Consequently, according to this embodiment, the three stages using the control words AC are advantageously replaced with a single stage. The advantage of this system is that a smart card can function only on one box and one alone: the one which contains the value L in memory (or on several so long as they have the same value of L, for example in the same house, as mentioned previously). This is another major advantage according to the invention. The invention in fact makes it possible to protect communications within an electronic apparatus which is to be made secure.

The invention also relates to a method of making secure an electronic apparatus intended to exploit scrambled data and a computer program product intended to be used within an electronic apparatus intended to exploit scrambled data. Said computer program product then includes a set of instructions which, when it is loaded within an electronic apparatus of this type, causes the electronic apparatus and in particular its hardware circuit parts to perform the steps of a method according to the invention. Software and hardware means can be used here.

Referring to one of FIGS. 3 and 5, the method according to the invention includes a step of reading a secret key L in a read only memory SME disposed on a dedicated hardware part HW of the electronic apparatus. This reading step is performed at the request of the calculation module CM in the memory SME, a calculation module CM to which the value of L (or a value derived from the secret value of L) is transmitted for a step of executing a calculation of an unscrambling key Kp under the control of a so-called calculation program stored on said dedicated hardware part, said calculation program including instructions for using, internally to said dedicated hardware part HW, the secret key L and at least one so-called external data item (AC[n,p] for FIG. 3 and Kpc for FIG. 5) and coming from outside said hardware part HW, in order to calculate an unscrambling key Kp, intended to be used internally to said dedicated hardware part HW. A step of unscrambling a stream of scrambled data SP is performed by the unscrambling module DSC, said unscrambling being enabled when the unscrambling key Kp corresponds to the scrambling key.

Although this invention has been described in accordance with the embodiments presented, a person skilled in the art will immediately recognize that there exist variants to the embodiments presented and that these variants remain within the spirit and scope of the present invention. Thus many modifications can be made by a person skilled in the art without for all that being excluded from the spirit and scope defined by the following claims.

The invention claimed is:

1. A secure data processing system including:
    an unscrambling module disposed on a dedicated hardware part of an integrated circuit and configured to unscramble a stream of data scrambled according to a scrambling key,
    a module for calculating an unscrambling key disposed on said dedicated hardware part and configured to manipulate data under the control of a so-called calculation program stored on said dedicated hardware part,
    a processor for at least controlling the functioning of the unscrambling and calculation modules, a read only memory disposed on said dedicated hardware part for storing a secret key, a key manipulation module for calculating supplementary bits from the secret key, and for manipulating the secret key using the supplementary bits to generate a final secret key, said calculation program including instructions for prompting said calculation module to use, internally to said dedicated hardware part, said final secret key and at least two so-called external data items coming from outside the secure data processing system, in order to calculate an unscrambling key, intended to be used internally to said dedicated hardware part, within the unscrambling module, and allowing unscrambling when the unscrambling key corresponds to the scrambling key, said calculation program including instructions for prompting said calculation module to use a first one of said two so-called external data items together with said final secret key to determine an interim result and to prompt said calculation module to utilize said interim result together with a second one of said two so-called external data items to determine said unscrambling key.

2. A secure data processing system as claimed in claim 1, characterized in that the secret key is laser fused.

3. A secure data processing system as claimed in claim 1, characterized in that the calculation module requires a key in a particular format and in that the key manipulation module provides the final secret key in the particular format, the secret key being insufficient to meet the particular format.

4. A secure data processing system as claimed in claim 1, characterized in that at least one so-called external data item is an item of conditional access information conveyed within the stream of scrambled data.

5. An electronic apparatus configured to use scrambled data including at least one secure data processing system as claimed in claim 4, exploitation means for exploiting the unscrambled data, and also including means of processing conditional access information conveyed within the scrambled data stream, said conditional access information processing means supplying conditional access information at least to the secure data system.

6. A secure data processing system as claimed in claim 1, characterized in that at least one so-called external data item is the unscrambling key scrambled according to said final secret key used in the calculation module.

7. An electronic apparatus configured to use scrambled data including at least one secure data processing system as claimed in claim 6, exploitation means for exploiting unscrambled data, also using conditional access control means implemented on a smart card, said smart card including means for calculating an unscrambling key, means for scrambling said unscrambling key according to said final secret key used within the calculation module, said scrambled unscrambling key being supplied to said secure data processing system.

8. A smart card configured to be used in an electronic apparatus configured to exploit scrambled external data as claimed in claim 7, said smart card including means for calculating an unscrambling key, means for scrambling said unscrambling key according to a secret key stored permanently within said electronic apparatus and within said smart card, said scrambled unscrambling key being intended to be supplied to said secure data processing system.

9. An electronic apparatus configured to use scrambled data including at least one secure data processing system as claimed in claim 1 and use means for exploiting the unscrambled data.

10. A secure data processing system as claimed in claim 1, wherein the processor is not disposed on the dedicated hardware part.

11. A secure data processing system as claimed in claim 1, wherein the key manipulation module is configured to generate the final secret key without using an external data item.

12. A method of protecting an electronic apparatus configured to exploit scrambled data, including the acts of:

reading a secret key in a read only memory disposed on a dedicated hardware part of the electronic apparatus, generating a final secret key by manipulating the secret key using supplementary bits calculated from the secret key, executing a calculation of an unscrambling key under the control of a so-called calculation program stored on said dedicated hardware part, said calculation program including instructions for using, internally to said dedicated hardware part, said final secret key and at least two so-called external data items coming from outside said hardware part, for calculating an unscrambling key, intended to be used internally to said dedicated hardware part, unscrambling a stream of scrambled data, said unscrambling being enabled when the unscrambling key corresponds to the scrambling key, wherein said executing act further comprises executing a calculation using a first one of said two so-called external data items together with said final secret key to determine an interim result and executing a calculation using said interim result together with a second one of said two so-called external data items to determine said unscrambling key.

13. A computer program product configured to be used within an electronic apparatus configured to exploit scrambled data, characterized in that said computer program product includes a set of instructions which, when it is loaded in such an electronic apparatus, causes the electronic apparatus to perform the acts of a method as claimed in claim 12.

14. A secure data processing system for unscrambling a stream of data using a first key that is provided in encrypted form to the system from an external source, the system comprising:

a calculation module disposed on a dedicated hardware part of an integrated circuit, the calculation module configured to calculate the first key;

an unscrambling module disposed on the dedicated hardware part, the unscrambling module configured to unscramble the stream of data using the first key; a read only memory disposed on the dedicated hardware part that stores a second key; and a key manipulation module for calculating supplementary bits from the second key, and for manipulating the second key using the supplementary bits and the second key to generate a final secret key, wherein the calculation module calculates the first key by using the final secret key to decrypt the first key.

15. A secure data processing system as claimed in claim 14, characterized in that the second key is laser fused to the dedicated hardware part.

16. A secure data processing system as claimed in claim 15, further including a public identifier stored in the read only memory, the public identifier being readable to verify laser fusing of the second key.

17. A secure data processing system as claimed in claim 14, characterized in that the calculation module requires a key in a particular format and in that the key manipulation module provides the final secret key in the particular format, the second key being insufficient to meet the particular format.

18. A secure data processing system as claimed in claim 14, characterized in that the first key is an item of conditional access information conveyed within the stream of scrambled data.

19. A secure data processing system as claimed in claim 14, further comprising a processor for at least controlling the functioning of the unscrambling and calculation modules, the processor being prohibited from accessing the second key or calculations performed using the second key.

20. A secure data processing system as claimed in claim 14, wherein the key manipulation module is configured to generate the final secret key without using an external data item.

21. A secure data processing system for unscrambling a stream of data using a first key that is provided in encrypted form to the system from an external source, the system comprising:
- a calculation module disposed on a dedicated hardware part of an integrated circuit, the calculation module configured to calculate the first key;
- an unscrambling module disposed on the dedicated hardware part, the unscrambling module configured to unscramble the stream of data using the first key; a read only memory disposed on the dedicated hardware part that stores a second key; and
- a key manipulation module for calculating supplementary bits from the second key, and for manipulating the second key using the supplementary bits and the second key to generate a final secret key, wherein the calculation module calculates the first key by using the final secret key to decrypt the first key, the first key being provided as first and second external data items, and wherein the calculation module uses the first external data item and the final secret key to calculate an interim result and the calculation module uses the interim result and the second external data item to calculate the first key.

22. A secure data processing system for unscrambling a stream of data using a first key that is provided in encrypted form to the system from an external source, the system comprising:
- a calculation module disposed on a dedicated hardware part of an integrated circuit, the calculation module configured to calculate the first key;
- an unscrambling module disposed on the dedicated hardware part, the unscrambling module configured to unscramble the stream of data using the first key;
- a read only memory disposed on the dedicated hardware part that stores a second key; and
- a key manipulation module for calculating supplementary bits from the second key, and for manipulating the second key using the supplementary bits and the second key to generate a final secret key,
wherein the calculation module calculates the first key by using the final secret key to decrypt the first key and wherein the second key includes a first set of bits and a second set of bits for creating a signature of the first set of bits, the signature being comparable to a value calculable by a test module from the first set of bits to thereby verify the second key.

\* \* \* \* \*